United States Patent Office
2,857,384
Patented Oct. 21, 1958

2,857,384

NEW PYRIDAZONE COMPOUNDS

Jean Druey, Riehen, and Konrad Meier, Basel, Switzerland, assignors to Ciba Pharmaceutical Products, Inc., Summit, N. J.

No Drawing. Application August 20, 1956
Serial No. 605,226

Claims priority, application Switzerland August 19, 1955

16 Claims. (Cl. 260—268)

This invention relates to new pyridazone-(6)-compounds. More particularly it concerns 5-piperazino-pyridazones-(6) which contain a phenyl radical in the 1-position and a lower alkoxy group such as methoxy, ethoxy or propoxy in the 3-position, and salts of these compounds. The new compounds may contain further substituents, especially at the ring nitrogen atom of the piperazino group, e. g. a lower alkyl or lower aliphatic acyl group, such as a methyl, formyl, acetyl or carbamyl radical or at the phenyl radical, e. g. halogen atoms. Specific and preferred embodiments of the invention are, for example, 1-phenyl-3-methoxy-5-piperazino-pyridazone-(6) of the formula

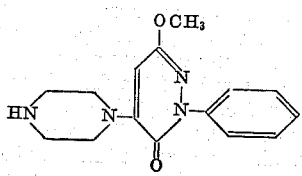

and 1-phenyl-3-methoxy-5-N'-methyl-piperazino - pyridazone-(6), and salts of these compounds.

The new compounds possess valuable pharmacological properties. Thus, they exhibit an antipyretic and analgesic action, and are useful as medicaments, e. g. analgesics.

The aforesaid 5-piperazino-pyridazone-(6)-compounds can be obtained by treating a 1-phenyl-3-chloro-5-piperazino-pyridazone-(6) with a lower alkanol, advantageously in the form of an alcoholate thereof.

If desired, in any compounds so obtained and containing a tertiary piperazino group, the latter group may be converted into a secondary piperazino group and/or a secondary piperazino group may be converted into a tertiary piperazino group. An example of a tertiary piperazino group convertible into a secondary piperazino group is a piperazino group containing as a substituent a lower aliphatic acyl radical capable of being split off by hydrolysis, or a benzyl radical capable of being eliminated by catalytic hydrogenation. A secondary piperazino group convertible into a tertiary piperazino group may be so converted, for example, by alkylation such as by methylation with formic acid and formaldehyde, or by acylation with a reactive lower aliphatic acid derivative, such as ethyl formate, acetic anhydride or phosgene. In the latter case the chlorine atom in the resulting compound can be exchanged for an amino group in the usual manner, carbamyl compounds being obtained.

The reactions are carried out by customary methods in the presence or absence of a diluent and/or a condensing agent and/or a catalyst, at the ordinary or a raised temperature, in an open vessel or under pressure in a closed vessel. The starting materials may be used in the form of salts thereof. A specific embodiment of this invention consists for example in treating 1-phenyl-3-chlor-5-piperazino-pyridazone-(6) or the hydrochloride thereof with sodium methylate, evaporating the reaction mixture, dissolving the residue in acid, rendering the acid solution alkaline and extracting the 1-phenyl-3-methoxy-5-piperazino-pyridazone-(6) with methylene chloride. It may be N-substituted by reaction with ethyl formate, acetic acid anhydride, phosgene (followed by treatment with an amine) and the like.

Depending on the method of working the new compounds are obtained as free bases or salts. From the salts the bases may be obtained in the usual manner. The free bases may be converted into the therapeutically useful acid addition salts thereof by conventional methods. Suitable acids for forming therapeutically useful salts are inorganic acids, for example, hydrohalic acids, sulphuric acids, nitric acid, phosphoric acids or thiocyanic acid or organic acids, for example, acetic acid, propionic acid, oxalic acid, malonic acid, succinic acid, maleic acid, methane sulphonic acid, ethane sulphonic acid, oxyethane sulphonic acid, benzene or toluene sulphonic acid or therapeutically active acids.

Those starting materials which are new can be made by usual methods. Advantageously the starting materials are so chosen as to lead to the formation of the compounds hereinbefore referred to as being especially useful.

The new compounds may be used as medicaments, for example, in the form of pharmaceutical preparations, which contain the compound or a salt thereof in admixture with a pharmaceutical organic or inorganic carrier suitable for enteral parenteral or topical administration. For making the carrier there are used substances which do not react with the new compounds, for example, water, gelatine, lactose, starches, magnesium stearate, talc, vegetable oils, benzyl alcohols, gums, polyalkylene glycols, petroleum jelly, cholesterol or other known carriers for medicaments. The pharmaceutical preparations may be made up, for example, in the form of tablets, dragees, salves, creams or in liquid form as solutions, suspensions or emulsions. If desired, they may be sterilised and/or contain auxiliary substances, such as preserving agents, stabilising agents, wetting or emulsifying agents, salts for regulating the osmotic pressure or buffers. They may also contain other therapeutically useful substances. The preparations also may be made by the usual methods.

The following examples illustrate the invention:

Example 1

16.35 grams of the hydrochloride of 1-phenyl-3-chloro-5-piperazino-pyridazone-(6) are heated for 10 hours in a steel tube at 120–130° C. with a sodium methylate solution prepared from 2.5 grams of sodium and 200 cc. of absolute methanol. The residue obtained after evaporating the solvent is dissolved in 2 N-hydrochloric acid, the solution is filtered with active carbon, rendered basic with potassium carbonate, and the base is extracted with methylene chloride. The crude base (14.78 grams) is dissolved in 52 cc. of 1 N-hydrochloric acid, the solution is decolorised with charcoal, evaporated to dryness and the residue is recrystallised from absolute alcohol. The colourless hydrochloride of 1-phenyl-3-methoxy-5-piperazino-pyridazone-(6) of the formula

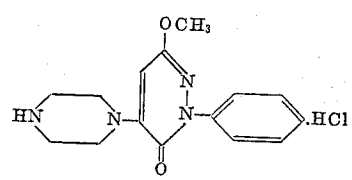

melts at 228–230° C.

From the crude base, other salts can be prepared, such as the sulfate, nitrate, methane sulfonate, phosphate, thiocyanate, oxalate, tartrate or succinate.

The 1-phenyl-3-chloro-5-piperazino-pyridazone-(6) used as starting material is prepared as follows:

96.4 grams of 1-phenyl-3:5-dichloro-pyridazone-(6) are boiled under reflux for 20 hours, while stirring, with 160 grams of piperazine hydrate in 1000 cc. of alcohol. After cooling the mixture it is filtered with suction, the filtrate is evaporated, and the residue together with the filtrate residue are treated with 2 N-hydrochloric acid. The by-product insoluble in hydrochloric acid is filtered off with suction, the filtrate is rendered basic by the addition of potassium carbonate, and the base is extracted with methylene chloride.

The yield amounts to 105.4 grams of crude base in the form of a brownish thickly liquid oil. The hydrochloride obtainable as indicated above crystallises from alcohol in the form of colourless lustrous lamellae melting at 253–255° C.

*Example 2*

30.45 grams of 1-phenyl-3-chloro-5-N'-methyl-piperazino-pyridazone-(6) are heated for 10 hours in a steel tube at 120–130° C. with a solution of 2.5 grams of sodium in 250 cc. of absolute methanol. The mixture is then evaporated to dryness, the residue is treated with 110 cc. of 1 N-hydrochloric acid, and, after filtration with charcoal, the hydrochloride solution is evaporated in vacuo, and the residue is recrystallised from a mixture of alcohol and acetone. The resulting hydrochloride of 1-phenyl-3-methoxy-5-N'-methyl-piperazino-pyridazone-(6) of the formula

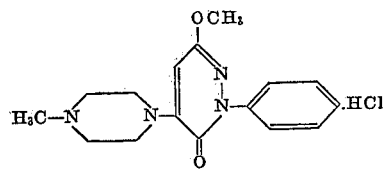

melts at 241–243° C. The yield amounts to 18.7 grams.

The 1-phenyl-3-chloro-5-N'-methyl-piperazino-pyridazone-(6) used as starting material is prepared as follows:

105.4 grams of crude 1-phenyl-3-chloro-5-piperazino-pyridazone-(6) (see Example 1) are dissolved in 100 cc. of dioxane, then mixed while cooling with 50 cc. of formic acid of 84 percent strength and 30 cc. of formaldehyde of 40 percent strength, and the mixture is heated at 90–100° C. until the initially vigorous evolution of gas ceases after about 4 hours. The mixture is then evaporated in vacuo, the residue is rendered alkaline with 10 N-solution of caustic soda and the base is extracted with methylene chloride. After being recrystallised from acetone the base melts at 97–99° C., and its hydrochloride at 170° C. with decomposition.

*Example 3*

7.15 grams of 1-phenyl-3-methoxy-5-piperazino-pyridazone-(6) are boiled under reflux with 25 cc. of ethyl formate for 5 hours. The excess formate is then distilled off in vacuo, the residue dissolved in methylene chloride, the methylene chloride solution washed with dilute hydrochloric acid, dried and evaporated. The residue is recrystallized from acetone. There is thus obtained the 1-phenyl-3-methoxy-5-N'-formyl-piperazino-pyridazone-(6) of the formula

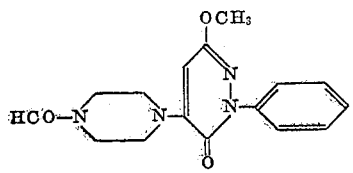

melting at 141–142° C. The yield is 6.5 grams. The starting material may be obtained as shown in Example 1 or as follows:

1.18 grams of 1-phenyl-3-methoxy-5-chloro-pyridazone-(6) are refluxed for 12 hours with 4.4 grams of piperazine hydrate in 40 cc. of alcohol. The alcohol is then distilled off and the residue treated with 2 N-hydrochloric acid, and the solution filtered. The acid filtrate is rendered alkaline with 10 N-caustic soda solution, and the precipitated base extracted with methylene chloride. The oil remaining after the methylene chloride has been distilled off is dissolved in the calculated quantity of 1 N-hydrochloric acid and the solution filtered with charcoal and evaporated to complete dryness. The hydrochloride of 1-phenyl-3-methoxy-5-piperazino-pyridazone-(6) so obtained is recrystallized from absolute alcohol. The yield is 1.24 grams, and the melting point is at 228° C. The 1-phenyl-3-methoxy-5-chloro-pyridazone-(6) used can be prepared as follows:

11.1 grams of 1-phenyl-3-hydroxy-5-chloro-pyridazone-(6) are stirred in 100 cc. of methanol with 5.3 cc. of dimethyl sulfate at 40° C. and a solution of 1.15 grams of sodium in 50 parts by volume of methanol added dropwise. When the addition is complete, the mixture is boiled under reflux for 1 hour. The methanol is distilled off under reduced pressure and the residue taken up in methylene chloride, and the methylene chloride solution washed with 2 N-caustic soda solution to remove any unreacted starting material. The methylene chloride is distilled off and the residue dissolved in hot isopropyl ether and the solution filtered hot with charcoal. The reaction mass is allowed to cool, any precipitated by-product removed by filtration, and the filtrate concentrated to one-third its volume. When the wall of the flask is scratched the 1-phenyl-3-methoxy-5-chloro-pyridazone-(6) crystallizes in the form of colorless prisms. When recrystallized again from isopropyl ether, the product melts at 83–84° C. The yield is 24%.

*Example 4*

7.15 grams of 1-phenyl-3-methoxy-5-piperazino-pyridazone-(6) are dissolved in 10 cc. of pyridine and mixed with 10 cc. of acetic anhydride. The mixture is allowed to stand overnight, then poured onto ice, acidified with 2 N-hydrochloric acid, and extracted with methylene chloride. The viscous syrup obtained on distilling off the methylene chloride crystallizes from a mixture of acetone and ether in the form of fine colorless crystals of melting point 118–119° C. The product is 1-phenyl-3-methoxy-5-N'-acetyl-piperazino-pyridazone-(6) of the formula

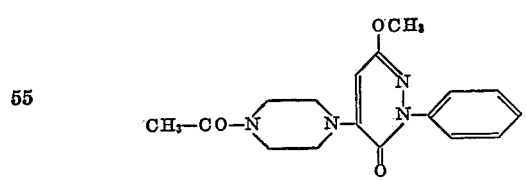

The yield is 6.35 grams.

*Example 5*

24.6 grams of hydrochloride of 1-phenyl-3-chloro-5-piperazino-pyridazone-(6) are heated to 120–130° C. for 10 hours with a solution of 3.9 grams of sodium in 300 cc. of absolute ethanol in a sealed tube. The reaction mixture is then acidified with dilute hydrochloric acid, and the alcohol distilled off. The residue is dissolved in water, the solution filtered through charcoal, the filtrate rendered basic with potassium carbonate, and the base extracted with methylene chloride. The methylene chloride solution in turn is extracted with 80 cc. of 1 N-hydrochloric acid, and the aqueous acid solution evaporated to dryness. The crystalline residue consists of the hydrochloride of 1-phenyl-3-ethoxy-5-piperazino-pyridazone-(6) of the formula

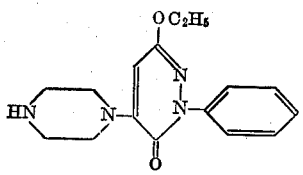

This product vigorously retains water of crystallization and therefore melts unsharply at 145–147° C. The yield is 17.5 grams.

*Example 6*

14.3 grams of 1-phenyl-3-methoxy-5-piperazino-pyridazone-(6), dissolved in 70 cc. of toluene, are added dropwise at 0–10° C. while stirring, to a solution of 25 grams of phosgene in 100 cc. of toluene and 50 grams of finely pulverized anhydrous potassium carbonate. After the addition of 20 cc. of acetone the reaction mass is stirred overnight at room temperature. The potash is then removed by filtration, the filtrate evaporated at 40–45° C., the residue dissolved in ether and the ethereal solution washed with dilute hydrochloric acid. The ether is distilled off and there remain 17.2 grams of a viscous oil which can be used as it is. After recrystallization from a mixture of acetone and ether, the pure chloroformyl derivative melts 94–96° C.

10 grams of 1-phenyl-3-methoxy-5-N'-chloroformyl-piperazino-pyridazone-(6) are dissolved in 150 cc. of absolute alcohol, and dry ammonia is introduced into the solution at room temperature with stirring for 12 hours. The colorless precipitate is filtered with suction, washed with water, and recrystallized from alcohol. The 1-phenyl-3-methoxy-5-N'-carbamyl-piperazino-pyridazone-(6) of the formula

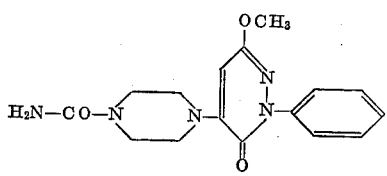

after recrystallization from alcohol, has the form of slightly yellowish-colored leaflets of melting point 232–233° C. The yield is 6.6 grams.

*Example 7*

7.2 grams of the hydrochloride of 1-para-chlorophenyl-3-chloro-5-piperazino-pyridazone-(6) are heated to 120–130° C. for 20 hours in a sealed tube with a solution of 1.1 grams of sodium in 150 cc. of absolute methanol. The methanol is distilled off, the residue dissolved while warm in 2 N-hydrochloric acid and the solution filtered through charcoal. The reaction mixture is then rendered alkaline with 2 N-caustic soda solution, and the base taken up in methylene chlorine. The methylene chloride solution is washed with water and then extracted with 25 cc. of 2 N-hydrochloric acid. The equeous acid phase is evaporated to dryness and there remain behind 6.4 grams of the crystalline hydrochloride of 1-para-chlorophenyl-3-methoxy-5-piperazino-pyridazone-(6) of the formula

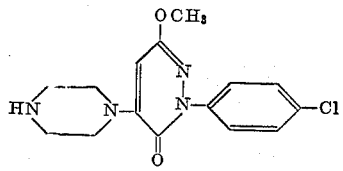

After recrystallization from absolute alcohol, the product melts at 250–251° C.

The 1-para-chlorophenyl-3-chloro-5-piperazino-pyridazone-(6) used as starting material can be prepared as follows:

119 grams of 1-para-chlorophenyl-3-hydroxy-pyridazone-(6) are heated with 330 cc. of phosphorous oxychloride at 100–110° C. for 1 hour while being stirred. Then 330 grams of phosphorus pentachloride are added in portions and the mixture refluxed for 6 hours. The whole is then introduced into water with stirring, the temperature being maintained at 65° C. by the addition of ice. The precipitated reaction product is filtered with suction, taken up in methylene chloride, and the solution washed neutral with water. The residue obtained when the methylene chloride is distilled off is recrystallized from methanol. There is obtained the 1-para-chlorophenyl-3,5-dichloro-pyridazone-(6) of the formula

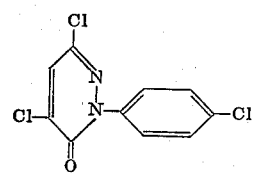

in the form of nearly colorless matted needles of melting point 163–165° C. The yield is 105 grams.

19 grams of this trichloro compound are dissolved in a mixture of 350 cc. of alcohol and 70 cc. of dioxane, mixed with 30 grams of piperazine hydrate, and heated at 70–80° C. for 12 hours. The reaction mass is then evaporated to dryness, the residue heated to the boil with 700 cc. of 1 N-hydrochloric acid, and the by-product which is insoluble in hydrochloric acid filtered off with suction while hot. The filtrate is filtered again through charcoal while hot; on cooling, the hydrochloride of 1-para-chlorophenyl-3-chloro-5-piperazino-pyridazone-(6) crystallizes in pure state. Its melting point is at 281–283° C. The yield is 21 grams.

*Example 8*

6 grams of 1-phenyl-3,5-dichloro-pyridazone-(6) are boiled with 60 cc. of alcohol and 8.8 grams of N-benzyl-piperazine under reflux for 1 hour. The alcohol is then distilled off, the residue triturated with dilute ammonia, the crystals separated by filtering with suction, washed well with water, and dried. The resulting 1-phenyl-3-chloro-N'-benzyl-piperazino-pyridazone crystallizes from alcohol in the form of yellowish prisms of melting point 139.5–140.5° C. The yield is 8.6 grams.

7.6 grams of this product are heated at 120–130° C. for 12 hours with a solution of 0.5 grams of sodium in 100 cc. of absolute methanol in a sealed tube. The alcohol is then distilled off, the residue dissolved in methylene chloride, the solution washed with water, dried and evaporated. The 1-phenyl-3-methoxy-5-N'-benzyl-piperazino-pyridazone-(6) crystallizes from a mixture of ether and petroleum ether in the form of colorless prisms of melting point 90.5–91° C. The yield is 5.65 grams.

3.76 grams of 1-phenyl-3-methoxy-5-N'-benzyl-piperazino-pyridazone-(6) are hydrogenated in 50 cc. of alcohol with 0.5 gram of 10% palladium charcoal. 227 cc. of $H_2$ are taken up as against a calculated 224 cc.

The catalyst is filtered off and the alcohol distilled off under reduced pressure. There is obtained the 1-phenyl-3-methoxy-5-piperazino-pyridazone in the form of a nearly colorless glassy mass (3.2 grams). The hydrochloride, (anhydrous modification) prepared as indicated in Example 1 and recrystallized repeatedly from absolute alcohol, melts at 221–223° C. and in admixture with the product obtained in Example 1 produces no lowering of the melting point.

*Example 9*

5.72 grams of 1-phenyl-3-methoxy-5-piperazino-pyridazone-(6) in 20 cc. of dioxane are heated at 90–100° C. with 1.5 cc. of formaldehyde solution of 40 percent strength and 5 cc. of formic acid of 84 percent strength until the initially strong evolution of gas subsides. The reaction mass is then evaporated under reduced pressure, the residue rendered alkaline with 10 N-caustic soda solution, and extracted with ether. The ether is distilled off and there remains behind the 1-phenyl-3-methoxy-5-N'-methyl-piperazino-pyridazone-(6) described in Example 2 in the form of a yellow oil.

What is claimed is:
1. 1-phenyl-3-methoxy-5-piperazino-pyridazone-(6).
2. Therapeutically useful acid addition salts of 1-phenyl-3-methoxy-5-piperazino-pyridazone-(6).
3. The hydrochloride of 1-phenyl-3-methoxy-5-piperazino-pyridazone-(6).
4. 1-phenyl-3-methoxy-5-N'-methyl-piperazino - pyridazone-(6).
5. Therapeutically useful acid addition salts of 1-phenyl-3-methoxy-5-N'-methyl - piperazino - pyridazone-(6).
6. The hydrochloride of 1-phenyl-3-methoxy-5-N'-methyl-piperazino-pyridazone-(6).
7. 1-para-chlorophenyl-3-methoxy-5-piperazino - pyridazone-(6).
8. Therapeutically useful acid addition salts of 1-para-chlorophenyl-3-methoxy-5-piperazino-pyridazone-(6).
9. The hydrochloride of 1-para-chlorophenyl-3-methoxy-5-piperazino-pyridazone-(6).
10. 1-phenyl-3-ethoxy-5-piperazino-pyridazone-(6).
11. Therapeutically useful acid addition salts of 1-phenyl-3-ethoxy-5-piperazino-pyridazone-(6).
12. The hydrochloride of 1-phenyl-3-ethoxy-5-piperazino-pyridazone-(6).
13. 1-phenyl-3-chloro-5-piperazino-pyridazone-(6).
14. 1-para-chlorophenyl-3-chloro-5-piperazino - pyridazone-(6).

15. A member of the group consisting of compounds of the formula:

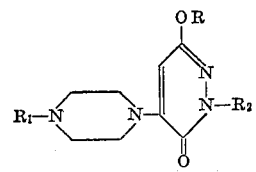

in which R stands for lower alkyl, $R_1$ for a member of the group consisting of hydrogen, formyl, lower alkyl, benzyl, lower alkyl carbonyl and carbamyl, and $R_2$ for a phenyl radical, and the therapeutically useful acid addition salts thereof.

16. Compounds of the formula:

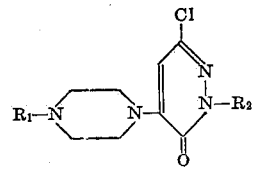

in which $R_1$ stands for a member of the group consisting of hydrogen, formyl, lower alkyl, benzyl, lower alkyl carbonyl and carbamyl, and $R_2$ for a phenyl radical.

References Cited in the file of this patent

Meier et al.: Helvetica Chimica Acta (Switzerland), vol. 37, pages 523–533 (1954).